(12) United States Patent
Fakukakis et al.

(10) Patent No.: US 11,175,071 B2
(45) Date of Patent: Nov. 16, 2021

(54) ZERO BACKLASH GEARLESS ROTARY ACTUATOR USABLE WITH SOLAR PANELS

(71) Applicant: Mechatron Solar, Stockton, CA (US)

(72) Inventors: Michael Fakukakis, San Mateo, CA (US); Athanasios Theocharis, Chalkida (GR)

(73) Assignee: Mechatron Solar, Stockton, CA (US)

( * ) Notice: Subject to any disclaimer, the term of this patent is extended or adjusted under 35 U.S.C. 154(b) by 141 days.

(21) Appl. No.: 16/236,477

(22) Filed: Dec. 29, 2018

(65) Prior Publication Data

US 2020/0208881 A1    Jul. 2, 2020

(51) Int. Cl.
| | |
|---|---|
| *F16H 31/00* | (2006.01) |
| *F24S 50/20* | (2018.01) |
| *F16D 49/10* | (2006.01) |
| *F24S 30/455* | (2018.01) |
| *H02S 20/32* | (2014.01) |
| *F15B 11/18* | (2006.01) |
| *F24S 30/00* | (2018.01) |

(52) U.S. Cl.
CPC .............. *F24S 50/20* (2018.05); *F15B 11/186* (2013.01); *F16D 49/10* (2013.01); *F16H 31/006* (2013.01); *F24S 30/455* (2018.05); *H02S 20/32* (2014.12); *F24S 2030/115* (2018.05); *F24S 2030/133* (2018.05); *F24S 2030/19* (2018.05)

(58) Field of Classification Search
CPC ...... F15B 11/186; F15B 15/04; F16H 31/006; F16H 31/00; F03D 80/88; H02S 20/30; H02S 20/32; F24S 50/20; F24S 30/452; F24S 30/455; F24S 30/422; F24S 2030/11; F24S 2030/19

USPC .................... 74/111, 112, 126, 164
See application file for complete search history.

(56) References Cited

U.S. PATENT DOCUMENTS

| | | | | |
|---|---|---|---|---|
| 8,587,775 | B1 * | 11/2013 | Wilson | F24S 30/452 |
| | | | | 356/139.01 |
| 2012/0045335 | A1 * | 2/2012 | Heidenreich | F03D 9/25 |
| | | | | 416/170 R |

FOREIGN PATENT DOCUMENTS

| | | | | |
|---|---|---|---|---|
| BE | 435036 | * | 6/1939 | |
| EP | 0522289 A1 | * | 1/1993 | ............ F15B 15/061 |
| FR | 2440526 A1 | * | 5/1980 | ............ F24S 30/452 |
| GB | 1194198 A | * | 6/1970 | ........... F16H 31/006 |

OTHER PUBLICATIONS

Machine translation of EP 0522289 (no date).*
Machine translation of FR 2440526 (no date).*
Machine translation of BE 435036 (no date).*

* cited by examiner

*Primary Examiner* — Nicholas J Lane
(74) *Attorney, Agent, or Firm* — Richard A. Fagin

(57) ABSTRACT

A rotary actuator has a rotatable platform rotatably supported on a base. The rotatable platform has a friction surface. An actuator band is operated by a band clamp so as to be selectively frictionally engageable with the friction surface. A motion actuator is coupled between the base and the actuator band such that change in length of the motion actuator causes corresponding movement of the actuator band. A brake band is operated by a brake band actuator so as to be selectively frictionally engageable with the friction surface, the brake band anchored to the base.

17 Claims, 7 Drawing Sheets

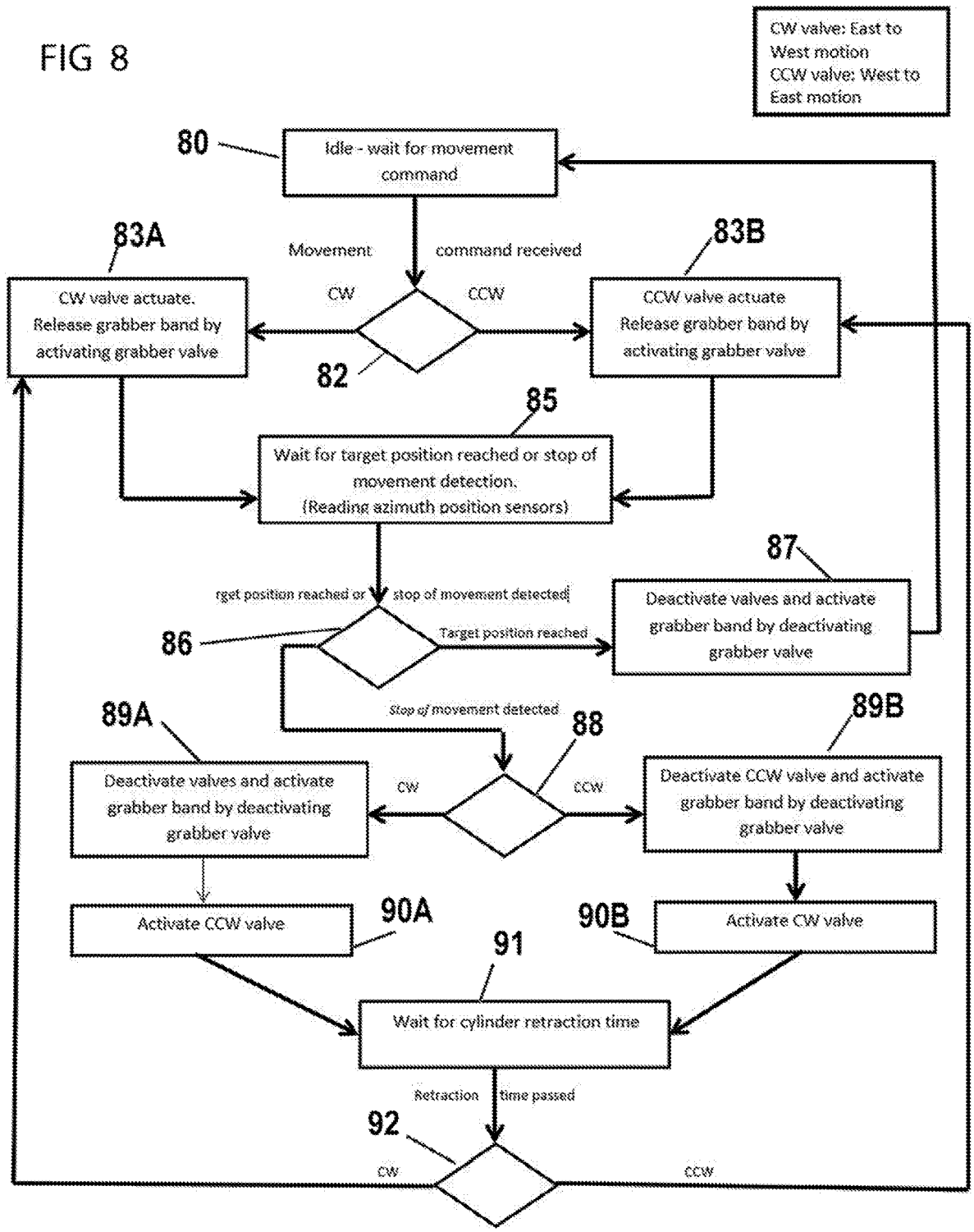

ZERO BACKLASH GEARLESS ROTARY ACTUATOR USABLE WITH SOLAR PANELS

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of rotating platforms for supporting solar trackers. More particularly, the disclosure relates to actuators used to rotate such platforms, e.g., to track position of the Sun.

In certain types of support platforms, such as those used for solar trackers and wind turbines, for example, rotary drive mechanisms are used to move a massive platform, which has to be rotated over an extended time period (usually twenty to thirty years) with relatively low speed and high accuracy. During operation of such platforms, there is high probability for external, abrupt forces (like gusty winds) to be applied to the rotary drive mechanism which may develop torque larger than the torque needed for rotating the platform.

Rotary actuators known in the art may use reducers, couplings, gears, and related mechanical components to convert rotation from, e.g., an electric motor, to the platform. Such actuator components are characterized by the fact that loads are transferred by positive involution of the moving parts (gears, chocks, coupling etc.). Mechanical characteristics which interact and affect substantially the lifetime cost of such actuators may comprise the following.

In cooperating parts such as gears, backlash is an integral part of the design. The backlash is imposed for reasons such as lubrication needs, provision for thermal expansion, manufacturing accuracy, manufacturing quality of the parts and the ability to assembly the parts easily. Although backlash is required, backlash may compromise operation where high accuracy in motion is required, such as in CPV (Concentrating Photovoltaics) or CSP (Concentrating Solar Power) solar tracking platforms. Additionally, because of the backlash, impulse loadings are caused at contact points between components during reversal of torque (e.g., such as may be imposed by wind acting on the supported components on the platform). Such impact loading may affect the adjacent parts, consequently resulting in additional damage caused by friction. Zero backlash or preloaded systems exist, however they may be very expensive. Additionally, zero backlash or preloaded systems, may suffer damage caused by friction over the expected lifetime of the system.

Overloading is a risk that can be mitigated only by designing the actuator system according to the maximum possible loads (e.g., as may be induced by storm force winds), even if such loading happens only once during the system lifetime. Because such loads may be orders of magnitude higher than working loads (resulting in oversizing the actuator components), or mitigating the risk by incorporating in the design additional safety devices for restricting maximum loads, designing conventional actuators to withstand overloading may Both of these options increase significantly the cost.

SUMMARY

A rotary actuator according to one aspect of the present disclosure includes a rotatable platform rotatably supported on a base. The rotatable platform has a friction surface. An actuator band is operated by a band clamp so as to be selectively frictionally engageable with the friction surface. A motion actuator is coupled between the base and the actuator band such that change in length of the motion actuator causes corresponding movement of the actuator band. A brake band is operated by a brake band actuator so as to be selectively frictionally engageable with the friction surface. The brake band is anchored to the base.

In some embodiments, the motion actuator comprises an hydraulic cylinder and ram.

Some embodiments further comprise an actuator control valve arranged to selectively conduct hydraulic fluid under pressure to selectively extend and retract the ram.

In some embodiments, the actuator control valve comprises a three-way solenoid operated valve.

Some embodiments further comprise a rotary position sensor arranged to detect rotation of the rotatable platform.

In some embodiments, the rotary position sensor comprises a reluctor ring and at least one detector coil.

Some embodiments further comprise a controller in signal communication with the band clamp, the motion actuator and the brake actuator. The controller is configured to operate the motion actuator to move while the band clamp is operated to frictionally engage the friction surface and the brake actuator is released. The controller is configured to operate the brake actuator to engage the brake band, release the band clamp and maintain position of the motion actuator.

In some embodiments, the controller comprises instructions thereon comprising an expected elevation of the sun and an expected azimuth of the sun, the expected elevation and expected azimuth related to a geodetic location of the actuator, a calendar date and a time of day.

In some embodiments, the band clamp comprises an hydraulic cylinder and tam.

In some embodiments, the brake actuator comprises an hydraulic cylinder and ram.

Some embodiments further comprise panels rotatably mounted to the rotatable platform. The panel is rotatable about an horizontal axis such that the panel is orientable at a selected angle of elevation.

Some embodiments further comprise an elevation actuator coupled between the panel and the rotatable platform.

In some embodiments, the elevation actuator comprises an hydraulic cylinder and ram.

Some embodiments further comprise a solar collector mounted to the panel.

A method according to another aspect of the disclosure for moving a rotatable platform to a selected rotary orientation, wherein the rotatable platform is rotatably supported on a base, the rotatable platform has a friction surface, an actuator band is operated by a band clamp so as to be selectively frictionally engageable with the friction surface, a motion actuator is coupled between the base and the actuator band such that change in length of the motion actuator causes corresponding movement of the actuator band, and a brake band is operated by a brake band actuator so as to be selectively frictionally engageable with the friction surface and the brake band is anchored to the base, comprises measuring the rotary orientation of the rotatable platform, and when the measured rotary orientation differs from the selected rotary orientation. The brake band is released from frictional engagement. The actuator is band, and the motion actuator is operated to rotate the rotatable platform.

Some embodiments further comprise stopping operation of the motion actuator, releasing the band clamp and engaging the brake band to lock the rotatable platform in rotational orientation.

Some embodiments further comprise reversing operation of the motion actuator and repeating the releasing the brake actuator, engaging the actuator band and operating the motion actuator when an amount of rotation needed to obtain the selected rotary orientation exceeds a rotation applicable by the motion actuator in a single operation thereof.

In some embodiment the measuring rotary orientation comprises detecting voltages induced in a coil by motion of teeth on a reluctor ring.

In some embodiments, the operating the motion actuator comprises applying hydraulic fluid pressure to a cylinder and ram.

In some embodiments, the engaging the brake band comprises applying hydraulic fluid pressure to a cylinder and ram.

Other aspects and advantages will be apparent from the description and claims that follow.

BRIEF DESCRIPTION OF THE DRAWINGS

FIG. 8 shows a flow chart of a method to control motion of a solar tracker.

DETAILED DESCRIPTION

Figure 1:
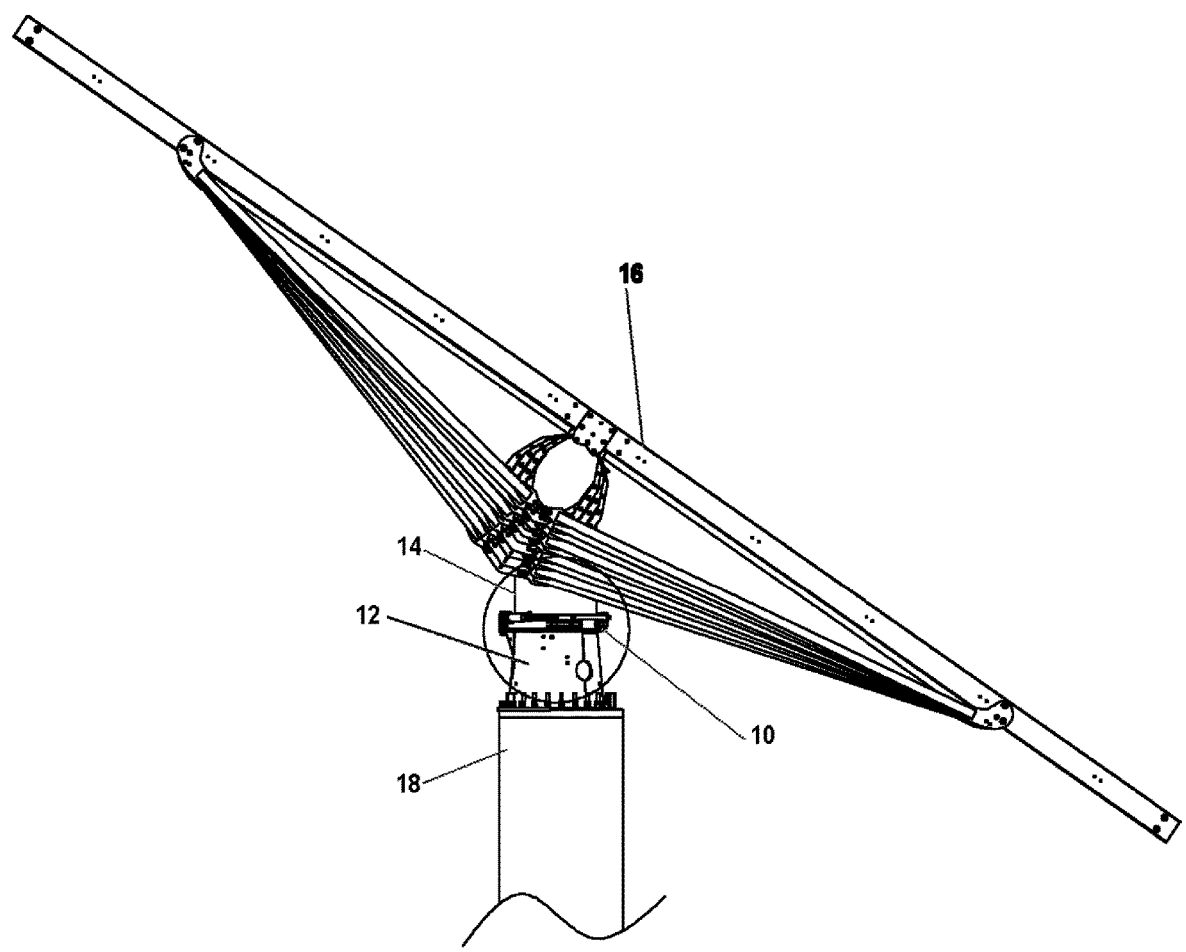
FIG. 1 shows an example embodiment of a rotary actuator used in connection with a solar tracker.

FIG. 1 shows an example embodiment of a rotary actuator 10 used in connection with a solar tracker. The rotary actuator 10 may comprise a rotatable platform 14, such as a solar tracker platform rotatably mounted to a base 12. The base 12 may be mounted on a mast 18, directly on the ground, on a building or on any other device to support the rotary actuator 10 at a required elevation. The rotatable platform 14 may be rotatably mounted on the base 12 using, for example, axial thrust bearings and radial bearings (not shown). The rotatable platform 14 may provide a mounting surface (see FIG. 5) on which to mount a device such as a solar collector 16. The solar collector 16 may comprise, for example and without limitation, a photovoltaic panel or a concentrator such as a mirror. The solar collector 16 may comprise a device (not shown) to orient the solar collector 16 at a selected angle of elevation with reference to geodetic horizontal. The rotary actuator 10 may be used to orient the solar collector 16 at a selected geodetic azimuth, for example, toward the sun at any time.

The rotatable platform 14 may rotate about a vertical axis of rotation V with reference to the base 12 to enable setting the selected geodetic azimuth. The solar collector 16 may be mounted to the rotatable platform 14 so as to be rotatable about a horizontal axis of rotation H to enable setting the angle of elevation.

As will be further explained below, the geodetic azimuth and angle of elevation may be related to the geodetic location of the rotary actuator, the time of day at the geodetic location and the calendar date. In some embodiments, the geodetic azimuth and angle of elevation may be, for example, stored in a look up table in a data storage device associated with or in communication with the controller.

Figure 2:
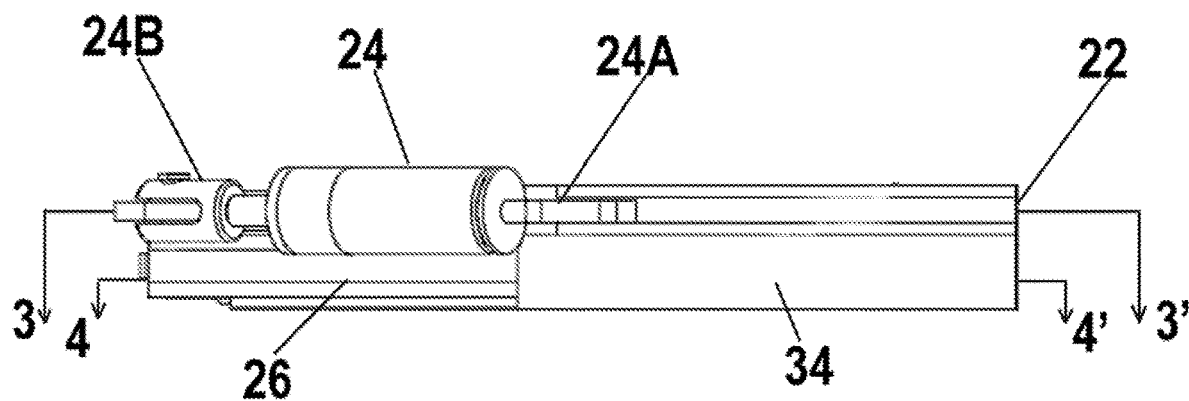
FIG. 2 shows a more detailed view of an actuator band, actuator and a brake band.

FIG. 2 shows functional components of the rotary actuator in more detail. An actuator band 22 may surround a friction surface 34 (also see 34 in FIGS. 3, 4 and 5) forming part of or rotationally coupled to the rotatable platform (14 in FIG. 1). The actuator band 22 may be moved by a motion actuator 24, which in the present example embodiment may be an hydraulic cylinder and ram. The motion actuator 24 may have one end 24A anchored to a rotationally fixed part, for example the base (12 in FIG. 1) and its other end 24B coupled to the actuator band 22. Action of the motion actuator 24 by extension and retraction causes the actuator band 22 to rotate relative to the base (12 in FIG. 1). As will be further explained with reference to FIG. 3, such actuator band 22 motion may be transferred to the rotatable platform 14 to cause rotation thereof relative to the base (12 in FIG. 1) to any selected azimuthal orientation.

In the present example embodiment, the friction surface 34 may extend longitudinally so as to provide a functional surface for a brake band 26. The brake band 26 may be anchored to the base (12 in FIG. 1) such that actuation of the brake band 26 holds the rotatable platform (14 in FIG. 1) in a fixed rotary orientation.

Figure 3:
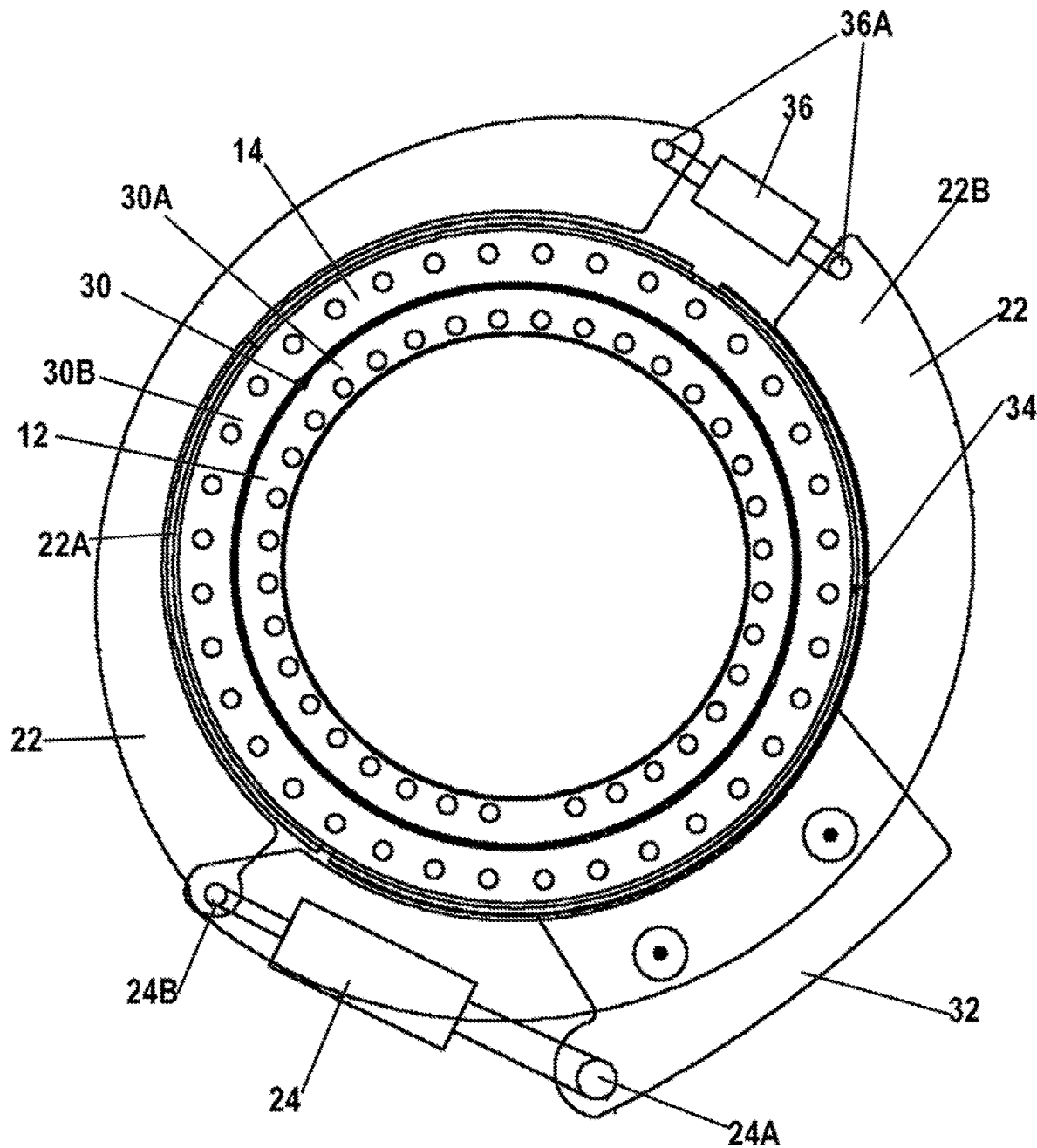
FIG. 3 shows a plan view of the actuator band, actuator and an actuator band clamp.

FIG. 3 shows a plan view of the actuator band 22 in order to better explain its structure and operation. The rotatable platform 14 is shown mounted to the base 12 using bearings 30 for rotational support. In the present example embodiment, the bearings 30 may comprise a slewing ring having an inner ring 30A rotatably supporting an outer ring 30B, these being respectively coupled to the base 12 and the rotatable platform 14. The actuator band 22 may comprise an internal friction lining 22A which may be similar in composition to any material known to be used for friction brakes. The actuator band 22 may comprise two circumferential segments 22B, which may be compressed circumferentially to cause the friction lining 22A to frictionally engage the friction surface 34. When the actuator band 22 is so engaged, torque applied to the actuator band 22 will be transferred to the friction surface 34 and thus to the rotatable platform 14. Correspondingly, when the actuator band 22 is disengaged by removing the compressional force, the actuator band 22 is movable without transferring any movement to the friction surface 34 (and thus to the rotatable platform 14). In the present example embodiment, the actuator band 22 may be compressed by operating an actuator band clamp 36 coupled at each end 36A to one of the actuator band segments 22A. In the present example embodiment, the actuator band clamp 36 may comprise an hydraulic cylinder and ram. The motion actuator 24 may be anchored at one end 24B to the actuator band 22 and at the other end 24A to an anchor plate 32. The anchor plate 32 may be coupled to the base 12 so as to provide a reaction point whereby extension and retraction of the motion actuator 24 causes torque to be applied to the actuator band 22.

In operation, to rotate the rotatable platform 14 to a selected azimuthal orientation, the following actions may occur. The band clamp 36 may be operated to compress the actuator band 22 into frictional engagement with the friction surface 34. The motion actuator 24 may then be extended or retracted depending on the intended direction of rotation of the rotatable platform 14 with respect to the base 12. When the motion actuator 24 is fully extended or retracted and more rotation is required, the band clamp 36 may be released and the motion actuator 24 may be retracted or extended, again depending on the intended direction of rotation. The foregoing sequence of events may be repeated until the rotatable platform 14 is oriented at the required azimuthal orientation.

Figure 4:
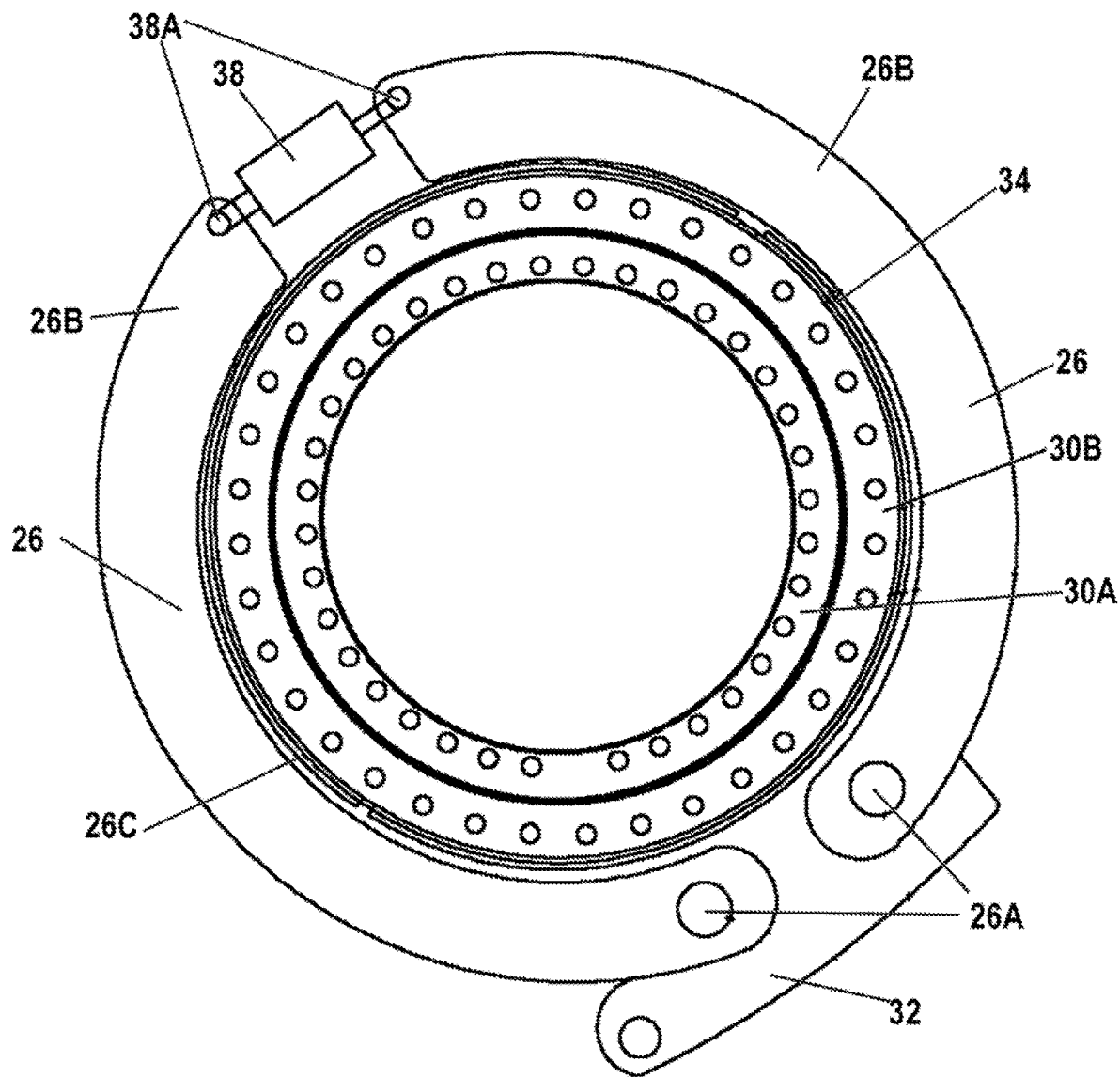
FIG. 4 shows a plan view the brake band and brake band actuator.

During times when the actuator band 22 is not frictionally engaged with the friction surface 34, that is, when the band clamp 36 is extended, the brake band (26 in FIG. 1) may be compressed so as to rotationally lock the position of the rotatable platform 14. Referring to FIG. 4, such operation of the brake band 26 may comprise operating a brake band actuator 38, which in the present example embodiment may comprise an hydraulic cylinder and ram. The brake band actuator 38 may be coupled at its ends 38A to each of two brake band segments 26B such that retraction of the brake band actuator 36 compresses the brake band 26. The brake band 26 may comprise a friction lining 26C similar in composition and purpose to the friction lining (22A in FIG. 3) on the actuator band (22 in FIG. 3). The brake band 26 may be anchored at circumferential ends 26A of the segments 22B to the base 12 at the anchor plate 32 or any other anchor point that is rotationally fixed with respect to the base 12. Thus, when the brake band 26 is compressed, the rotatable platform 14 is held in rotationally fixed orientation. In the present example embodiment, an amount of compression force applied to the brake band 26 by the brake band actuator 36 may be chosen to limit the amount of torque that may be applied to the rotatable platform 14. Such torque limit may be chosen, for example, in relation to the amount of wind force that may affect the solar collector (16 in FIG. 1) whereby wind force will not damage the solar collector (16 in FIG. 1) but will merely cause the rotatable platform 14 to move such that the wind force applied to the solar collector (16 in FIG. 1) is minimized.

Figure 5:
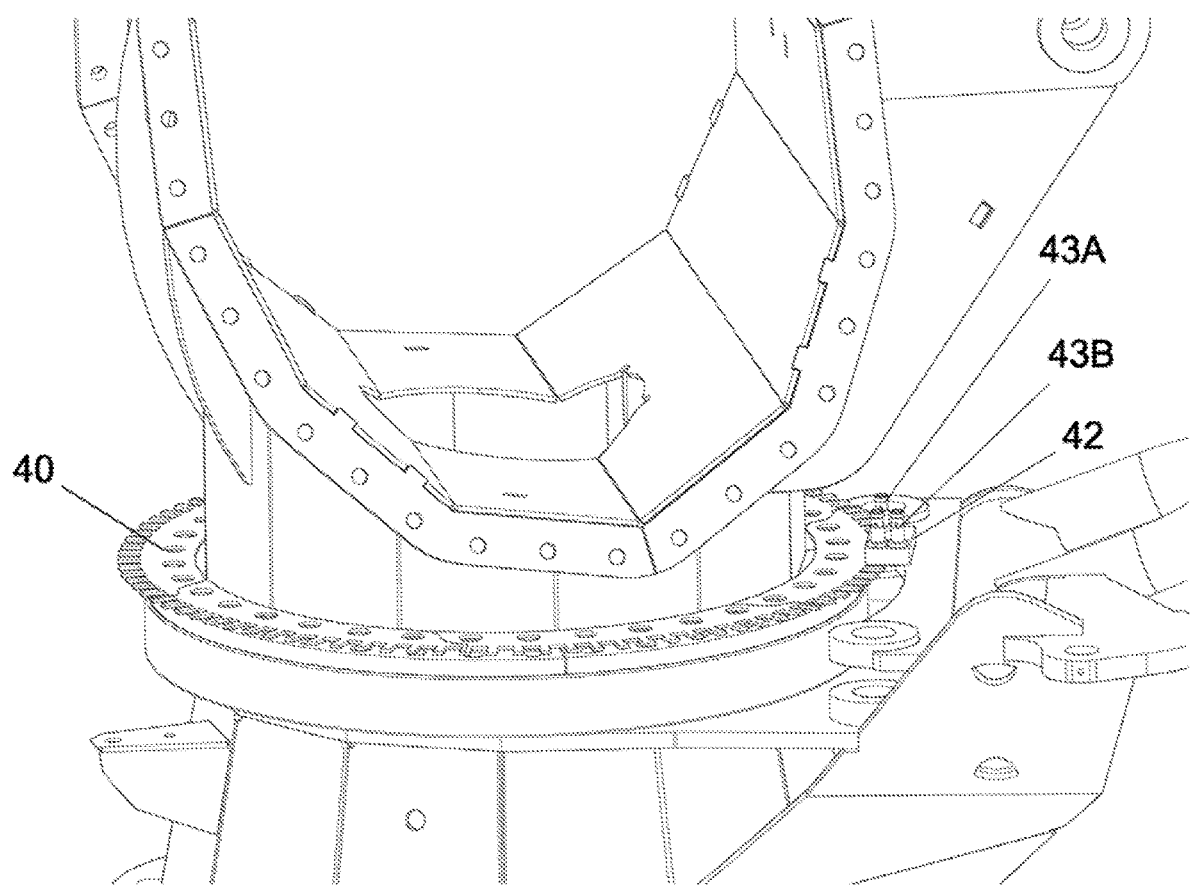
FIG. 5 shows an example embodiment of a rotary encoder system including a reluctor ring and sensors.
Figure 6:
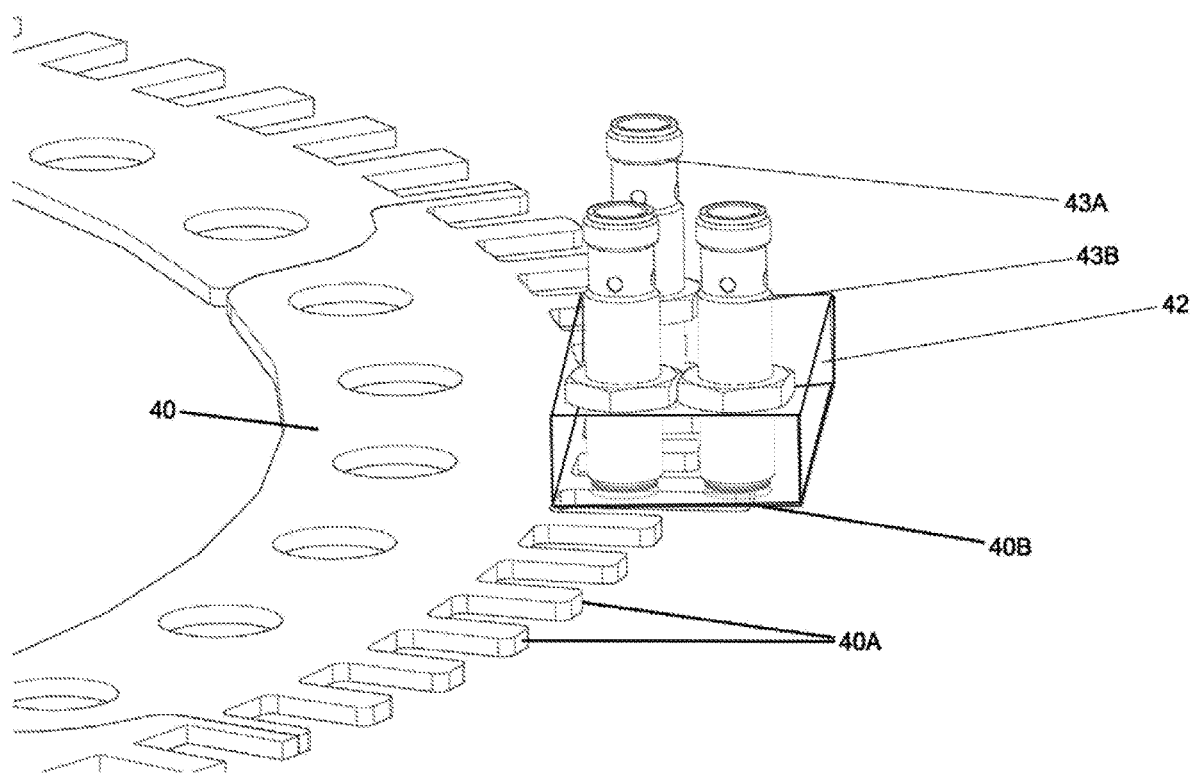
FIG. 6 shows a more detailed view of the embodiment shown in FIG. 5 including an absolute position pin on the reluctor ring and its associated sensor.

In the present example embodiment, and referring to FIG. 5, rotary orientation of the rotatable platform 14 may be measured using a rotary orientation sensor. In the present example embodiment, the rotary orientation sensor may comprise a sensor ring 40 such as a magnetic reluctor ring coupled to the rotatable platform 14 such that rotation thereof causes corresponding rotation of the sensor ring 40. In the present example embodiment the sensor ring 40 may be made from high magnetic permeability material or have such material applied to a suitable substrate structure such that rotation of the sensor ring 40 induces magnetic field changes. Such magnetic field changes may be detected by a fixed sensor 42. In the present example embodiment, the fixed sensor 42 may comprise detector coils 43A, 43B in which a voltage may be induced by movement of the sensor ring 40. Referring to FIG. 6, the sensor ring 40 may comprise short sensor teeth 40A motion of which is detectable by first sensing coils 43A. A long sensor tooth 40B may provide an absolute rotary position reference detectable by a second sensing coil 43B. The sensor ring 40 may be affixed to the rotatable platform 14 such that the long sensor tooth 40B corresponds to a selected geodetic azimuthal orientation of the rotatable platform 14, for example and without limitation geodetic or geomagnetic north. Voltages induced in the coils 43A, 43B may be conducted to any suitable controller (explained in more detail below) to provide measurements corresponding to the rotary orientation of the rotatable platform 14.

FIG. 5 also shows the mounting surface 14A for the solar collector (16 in FIG. 1).

It will be appreciated by those skilled in the art that the embodiment of a rotary orientation sensor described with reference to FIGS. 5 and 6 is only intended as one example of such sensor and such embodiment is not intended to limit the scope of the present disclosure. Other types of rotary orientation sensors may be used in other embodiments, for example, the sensor ring 40 may comprise openings for triggering a photo-optical sensor or the teeth 40A, 40B may be arranged to operate one or more electromechanical switches. In some embodiments, the rotary orientation sensor may comprise one or more flux gate magnetometers arrange to measure rotary orientation with respect to geomagnetic north. Some embodiments may comprise one or more gyroscopes of any known type to measure geodetic rotary orientation at any time.

It will also be appreciated that the arrangement of the component of the rotary actuator 10 shown in and explained with reference to FIGS. 1 through 5 may have the functions performed as described in an opposed arrangement. For example, the friction surface 34 in some embodiments may be provided on an interior circumference of a part of the rotatable platform 14 disposed within the base 12, rather than outside the base as shown in FIGS. 3 and 4 in particular. Correspondingly, the actuator band 22 may have a friction lining disposed on its exterior, whereby expansion of the actuator band 22 may provide frictional engagement thereof with such interior friction surface. In such embodiments, the brake band 26 may also be disposed within the interior friction surface and be arranged to frictionally engaged therewith by expansion of the brake band 26 rather than compression thereof. Such embodiments are therefore within the scope of the present disclosure.

Figure 7:
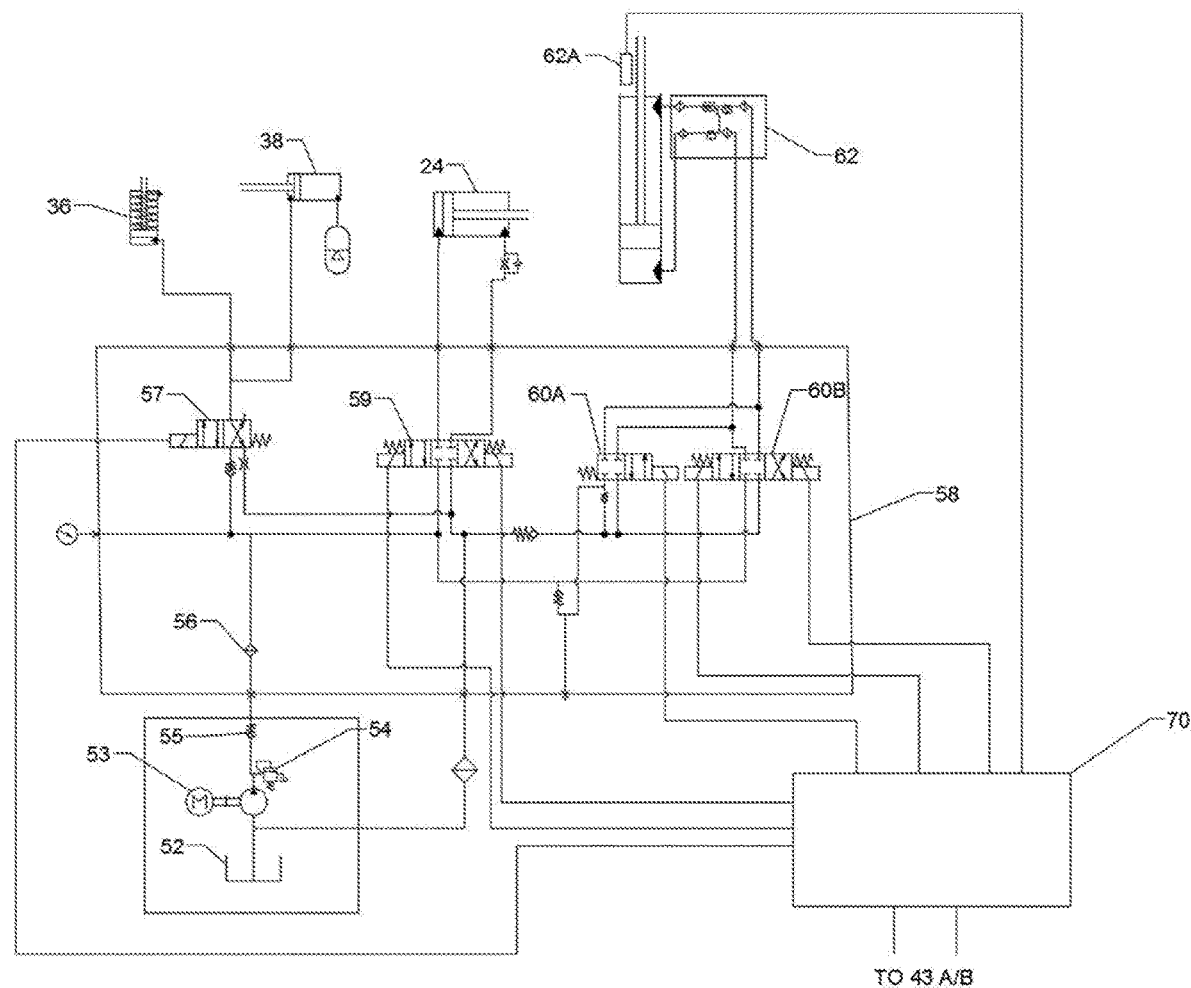
FIG. 7 shows an example embodiment of an hydraulic system operable to control actuators in the embodiment of FIGS. 1 and 2.

An example embodiment of an hydraulic control system operable to move the solar collector (16 in FIG. 1) to a selected azimuthal orientation and selected elevation orientation is shown schematically in FIG. 7. A central processor 70, for example, a microprocessor, microcomputer, programmable logic controller or any similar device may accept as signal input signals from the coils (43A, 43B in FIG. 6) or other type of rotational orientation sensor(s). The processor 70 may accept as signal input signals from an elevation angle sensor 62A, for example a linear variable differential transformer (LVDT) coupled to an elevation actuator 62. The elevation actuator may be arranged to rotate the solar collector (16 in FIG. 1) about the horizontal axis (H in FIG. 1) to move the solar collector (16 in FIG. 1) to the chosen elevation angle. The movement actuator is shown at 24 and the brake actuator is shown at 38. The band clamp 36 is shown connected to a brake control valve 57. Hydraulic fluid under pressure may be provided by a pump 54 driven by a motor 53. The pump 54 withdraws hydraulic fluid from a reservoir 52 and discharges the fluid under pressure to a control manifold 58. The control manifold 58 may comprise the brake control valve 57, which may be a three way, solenoid operated valve arranged to provide the hydraulic fluid under pressure to selectively expand and retract the brake actuator 38 and the band clamp 36. A motion actuator valve 59 may also be a three way, solenoid operated valve arranged to conduct hydraulic fluid under pressure to selectively expand and retract the motion actuator 24. The elevation actuator 62 may be similarly controlled such as by an elevation control valve or valves 60A, 60B. The brake actuator valve 57, motion actuator valve 59 and the elevation actuator valve(s) 60A, 60B may be operated by the central processor 70.

FIG. 8 shows a flow chart of an example process that may be programmed into the central processor (70 in FIG. 7) to operate the various components described above to move the rotatable platform (14 in FIG. 1) to the selected azimuthal orientation and at selected times adjust the orientation to match the orientation that is desired at any time. At 80, the central processor (70 in FIG. 1) responds to the condition that the rotatable platform (14 in FIG. 1) is oriented at the selected azimuthal orientation. In such condition, the brake actuator valve (57 in FIG. 1) is operated to keep the brake actuator (38 in FIG. 4) in the actuated position. Thus the rotatable platform (14 in FIG. 1) is locked in position rotationally. As explained above, the rotational locking is limited to a selected threshold torque in the event excessive force, such as from wind, is applied to the solar collector (16 in FIG. 1). In such condition, measurements from the rotary orientation sensor (FIGS. 5 and 6) as communicated to the central processor (70 in FIG. 7) match the expected rotary orientation to within a selected threshold.

When the measurements from the rotary orientation sensor indicate that the rotary orientation of the rotatable platform (14 in FIG. 1) deviate from the selected rotary orientation by at least a selected threshold amount, the central processor (70 in FIG. 7) may operate the brake actuator valve 57 to release the brake actuator (38 in FIG. 7) and actuate the band clamp (36 in FIG. 7). The central processor 70 then operates the movement actuator valve 59 either to extend at 83A or retract at 83B the motion actuator 24. At 84, the motion actuator moves so as to rotate the rotatable platform 14. At 85, the measurements from the rotational orientation sensor are compared to the selected rotational orientation in the central processor 70; the central processor maintains extension/retraction of the motion actuator 24 until at 87 either the limit of travel of the motion actuator or the selected rotary orientation is obtained. If the selected rotary orientation is obtained, the central processor 70 operates the movement control valve 59 to stop the motion actuator 24. Then the brake actuator 38 is actuated and the band clamp 36 is released. If the selected rotary or azimuthal orientation is not obtained, it is necessary to retract or extend, as the case may be, the motion actuator 24 and repeat its movement as explained above until either described limit is reached. The foregoing is shown in FIG. 8 at 88, 89A, 89B; 90A and 90B and at 91 waiting for retraction or extension of the motion actuator until retraction or extension is obtained. At such time, at 92, the process returns to 83A or 83B to continue rotation of the rotatable platform.

Although only a few examples have been described in detail above, those skilled in the art will readily appreciate that many modifications are possible in the examples. Accordingly, all such modifications are intended to be included within the scope of this disclosure as defined in the following claims.

What is claimed is:
1. A rotary actuator, comprising:
a rotatable platform rotatably supported on a base, the rotatable platform having a friction surface;
an actuator band operated by a band clamp so as to be selectively frictionally engageable with the friction surface;
a motion actuator coupled between the base and the actuator band such that change in length of the motion actuator causes corresponding rotational movement of the actuator band;
a brake band operated by a brake band actuator so as to be selectively frictionally engageable with the friction surface, the brake band anchored to the base, such that frictional engagement of the brake band rotationally locks the rotatable platform and
a rotary position sensor comprising a reluctor ring having rotationally spaced apart teeth, at least one of the rotationally spaced apart teeth being longer than others of the rotationally spaced apart teeth, a first detector coil arranged to detect movement of the at least one of the longer rotationally spaced apart teeth, and a second detector coil arranged to detect movement of the others of the rotationally spaced apart teeth, the at least one of the longer teeth corresponding to a geodetic azimuthal reference.

2. The actuator of claim 1 wherein the motion actuator comprises an hydraulic cylinder and ram.

3. The actuator of claim 2 further comprising an actuator control valve arranged to selectively conduct hydraulic fluid under pressure to selectively extend and retract the ram.

4. The actuator of claim 3 wherein the actuator control valve comprises a three-way solenoid operated valve.

5. The actuator of claim 1 further comprising a controller in signal communication with the band clamp, the motion actuator and the brake actuator, the controller configured to operate the motion actuator to move while the band clamp is operated to frictionally engage the friction surface and the brake actuator is released, the controller configured to operate the brake actuator to engage the brake band, release the band clamp and maintain position of the motion actuator.

6. The actuator of claim 1 wherein the controller comprises instructions thereon comprising an expected elevation of the sun and an expected azimuth of the sun, the expected elevation and expected azimuth related to a geodetic location of the actuator, a calendar date and a time of day.

7. The actuator of claim 1 wherein the band clamp comprises an hydraulic cylinder and ram.

8. The actuator of claim 1 wherein the brake actuator comprises an hydraulic cylinder and ram.

9. The actuator of claim 1 further comprising a panel rotatably mounted to the rotatable platform, the panel rotatable about an horizontal axis such that the panel is orientable at a selected angle of elevation.

10. The actuator of claim 8 further comprising an elevation actuator coupled between the panel and the rotatable platform.

11. The actuator of claim 9 wherein the elevation actuator comprises an hydraulic cylinder and ram.

12. The actuator of claim 9 further comprising a solar collector mounted to the panel.

13. A method for moving a rotatable platform to a selected rotary orientation, the rotatable platform rotatably supported on a base, the rotatable platform having a friction surface, an actuator band operated by a band clamp so as to be selectively frictionally engageable with the friction surface, a motion actuator coupled between the base and the actuator band such that change in length of the motion actuator causes corresponding rotational movement of the actuator band and the rotatable platform; and a brake band operated by a brake band actuator so as to be selectively frictionally engageable with the friction surface, the brake band anchored to the base to rotationally lock the rotatable platform, the method comprising:

measuring the rotary orientation of the rotatable platform, and when the measured rotary orientation differs from the selected rotary orientation;

releasing the brake band from frictional engagement;

engaging the actuator band;

operating the motion actuator to rotate the rotatable platform; and wherein the measuring rotary orientation comprises detecting voltages induced in a first coil by motion of short teeth on a reluctor ring and detection of voltages induced in a second coil by at least one tooth on the reluctor ring longer than the short teeth, a position of the at least one longer tooth corresponding to a geodetic azimuthal reference.

14. The method of claim 13 further comprising stopping operation of the motion actuator, releasing the band clamp and engaging the brake band to lock the rotatable platform in rotational orientation.

15. The method of claim 14 further comprising reversing operation of the motion actuator and repeating the releasing the brake actuator, engaging the actuator band and operating the motion actuator when an amount of rotation needed to obtain the selected rotary orientation exceeds a rotation applicable by the motion actuator in a single operation thereof.

16. The method of claim 13 wherein the operating the motion actuator comprises applying hydraulic fluid pressure to a cylinder and ram.

17. The method of claim 13 wherein the engaging the brake band comprises applying hydraulic fluid pressure to a cylinder and ram.

* * * * *